US010328538B2

(12) United States Patent
Tsui et al.

(10) Patent No.: US 10,328,538 B2
(45) Date of Patent: Jun. 25, 2019

(54) ROTARY POSITIONER WITH OUTRIGGERS

(71) Applicants: Gary Tsui, San Marino, CA (US); Tony Juan Alba, West Covina, CA (US)

(72) Inventors: Gary Tsui, San Marino, CA (US); Tony Juan Alba, West Covina, CA (US)

( * ) Notice: Subject to any disclaimer, the term of this patent is extended or adjusted under 35 U.S.C. 154(b) by 209 days.

(21) Appl. No.: 15/655,041

(22) Filed: Jul. 20, 2017

(65) Prior Publication Data
US 2019/0022808 A1 Jan. 24, 2019

(51) Int. Cl.
*B23Q 1/25* (2006.01)
*B23Q 1/28* (2006.01)
*B23Q 1/52* (2006.01)
*B23Q 1/62* (2006.01)
*B23Q 1/66* (2006.01)
*B23Q 7/02* (2006.01)
*B23K 37/04* (2006.01)
*B23P 21/00* (2006.01)
*B23K 37/047* (2006.01)
*B23K 37/053* (2006.01)

(52) U.S. Cl.
CPC ............. *B23Q 1/66* (2013.01); *B23K 37/047* (2013.01); *B23K 37/0461* (2013.01); *B23Q 1/25* (2013.01); *B23Q 1/28* (2013.01); *B23Q 1/525* (2013.01); *B23Q 1/621* (2013.01); *B23Q 7/02* (2013.01); *B23K 37/0531* (2013.01); *B23P 21/006* (2013.01)

(58) Field of Classification Search
CPC .......... B25H 1/0007; B25H 1/18; B23Q 7/02; B23Q 16/06; B23Q 16/065; B23Q 1/52; B23Q 1/525; B23Q 1/5437
See application file for complete search history.

(56) References Cited

U.S. PATENT DOCUMENTS

| | | | | |
|---|---|---|---|---|
| 811,448 | A * | 1/1906 | Shellenberger | B23Q 1/621 269/296 |
| 1,127,969 | A * | 2/1915 | Dolder | B23Q 1/5437 254/124 |
| 1,792,612 | A * | 2/1931 | Staley | B25H 1/0007 248/185.1 |
| 2,311,668 | A * | 2/1943 | Kennedy | F16M 3/00 248/130 |
| 2,340,707 | A * | 2/1944 | Staley | B25H 1/0007 74/425 |
| 2,536,239 | A * | 1/1951 | Tyndall | H05K 7/14 269/152 |
| 2,654,147 | A * | 10/1953 | Wilson | B25H 1/0007 269/17 |
| 2,991,994 | A * | 7/1961 | Kulp | B25H 1/0007 269/141 |

(Continued)

*Primary Examiner* — Tyrone V Hall, Jr.
(74) *Attorney, Agent, or Firm* — Jen-Feng Lee, Esq.

(57) ABSTRACT

Present invention relates to a rotary positioner that allows a welding table's work surface to be set at an angle as desired by a user. Two vertical frames can move and slide along the length of a chassis-bar to adjust the distance between the two vertical frames. As long as the length of a welding table does not exceed the total greatest distance between the two vertical frames, the present invention can fit any work table or welding table. Caster wheels and height adjustment knobs allow for easy movement and balancing of the rotary positioner.

11 Claims, 11 Drawing Sheets

(56) References Cited

U.S. PATENT DOCUMENTS

| | | | | |
|---|---|---|---|---|
| 4,093,199 | A * | 6/1978 | Hefner | B25H 1/0007 269/61 |
| 4,239,197 | A * | 12/1980 | Olstad | B23Q 1/525 269/152 |
| 4,880,194 | A * | 11/1989 | Geise | B05B 13/0285 248/166 |
| 5,535,995 | A * | 7/1996 | Swann | B23Q 3/103 269/152 |
| 5,562,277 | A * | 10/1996 | Swann | B23Q 3/103 269/152 |
| 6,561,470 | B1 * | 5/2003 | Gottfredson | B05B 13/0228 248/130 |
| 6,619,640 | B1 * | 9/2003 | Ploski | B23Q 1/52 269/17 |
| 7,434,491 | B1 * | 10/2008 | Sutton, Jr. | B23K 37/0452 74/490.01 |
| 2004/0146369 | A1 * | 7/2004 | Kato | B23Q 1/5437 409/219 |
| 2010/0262275 | A1 * | 10/2010 | Schoening | B23K 20/023 700/213 |
| 2011/0101586 | A1 * | 5/2011 | Lands | B25H 1/0007 269/57 |
| 2014/0259663 | A1 * | 9/2014 | Scelsi | B25H 1/0007 29/888.01 |

\* cited by examiner

ROTARY POSITIONER WITH OUTRIGGERS

FIELD AND BACKGROUND OF THE INVENTION

Work tables and welding tables are common tools. Mostly, their work surface is designed to be flat and level, in the perspective of a plumb orientation.

However, the need to have an incline angle set, per user requirement, may arise from time to time. Although there are available on the market certain angle-adjustable welding tables, there has been no simple and versatile device to achieve the stated goals stated herein.

The rotary positioner of present invention further allows for the installation of a welding table of different sizes, by its design of two vertical frames sliding along the length of a base chassis.

The rotary positioner of present invention, by the major components of a chassis-bar and two vertical frames sliding along the length of the chassis-bar, with outriggers to provide stability, gives an answer to the industry needs as further explained herein.

SUMMARY OF THE INVENTION

The invention relates to a rotary positioner to install a work table, or more specifically a welding table, where the incline angle of the work surface of the welding table can easily be set by a user as desired. The rotary positioner also provides for easy move-around thanks to the caster wheels, and easy balancing capacity thanks to the height adjustment knobs.

Two vertical frames can move and slide along the length of the chassis-bar to adjust the distance between the two vertical frames. As long as the length of a welding table does not exceed the total greatest distance between the two vertical frames, the present invention provides for an easy solution.

An active rotating mechanism is located in the upper portion section of the first vertical frame. The second vertical frame has a tail stock, which further consists of a height adjustment mechanism and a passive rotation mechanism.

The active rotating mechanism is further made up of a rotating plate and a turning mechanism, connected by a rotating shaft.

The turning mechanism consists of a hand wheel that is connected to a gear box, so that the axial turning direction of the hand wheel is transformed by the gear box results in a 90-degree change, aligning with the axial direction of the rotating shaft.

A plurality of holes are made around the peripheral portion of the rotating plate. A specific example is that there are a total of 24 holes are made to exist, so that the gap angle between any two holes is 15 degrees.

The turning mechanism further has a toggle latch with a plunger end for inserting through a second hole on the first vertical frame. The plunger end inserts into one of the holes, serving as the means to lock the incline angle of a welding table in place, as desired.

DESCRIPTION OF THE DRAWINGS

The accompanying drawings, which are incorporated in and constitute a part of this specification, illustrate and exemplify the preferred embodiments of the invention. Together with the description, serve to explain the principles of the invention.

A brief description of the drawings is as follows.

DETAILED DESCRIPTION OF THE PREFERRED EMBODIMENT

As shown by the figures, a rotary positioner 500 with outriggers of the present application is comprised of three major parts: a chassis-bar 30, a first vertical frame 10, and a second vertical frame 20.

Figure 1:
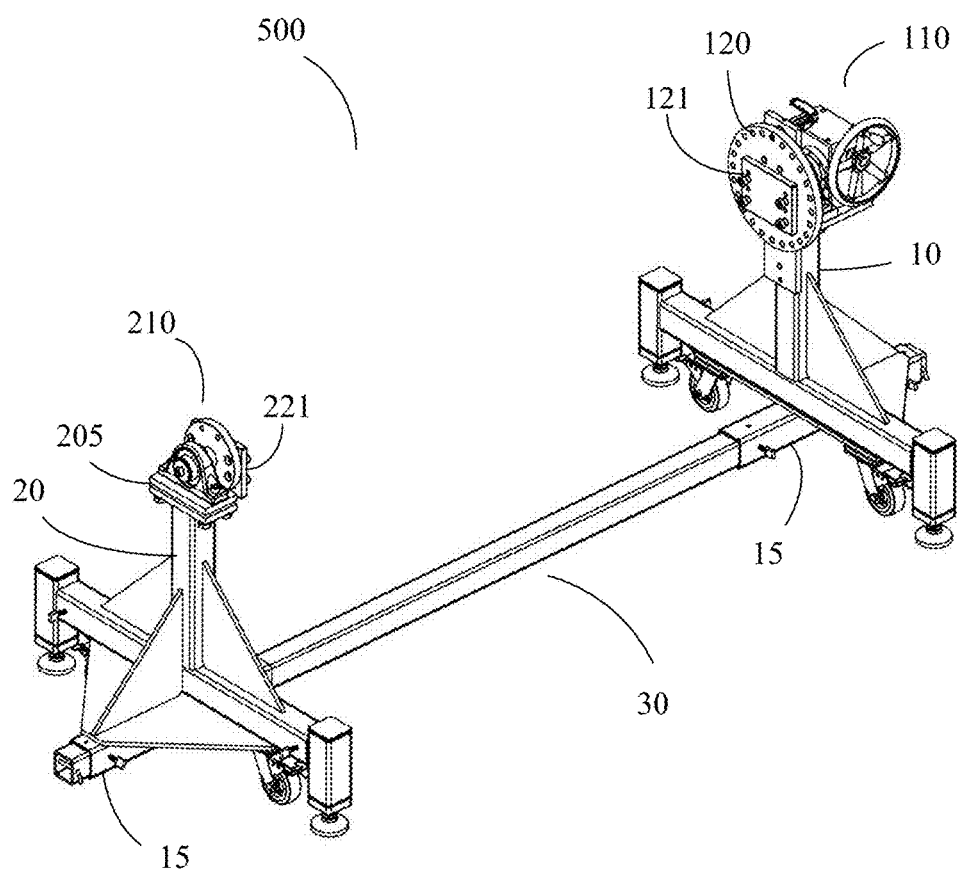
FIG. 1 shows the present invention of a rotary positioner.

See FIG. 1, each of the two vertical frames 10 and 20 has a wrapping tube 15 that is snuggly wrapped around the chassis-bar 30. The two vertical frames 10 and 20, via the connection made by wrapping tubes 15, can move and slide along the length of the chassis-bar 30, thus adjusting the distance between the two vertical frames 10 and 20. See FIG. 4 to see the two vertical frames 10/20 being set closer to each other, via the sliding connection of the wrapping tubes 15 and the chassis-bar 30, providing the set up for a welding table that's shorter than, for example, the longer version in FIG. 2.

Figure 2:
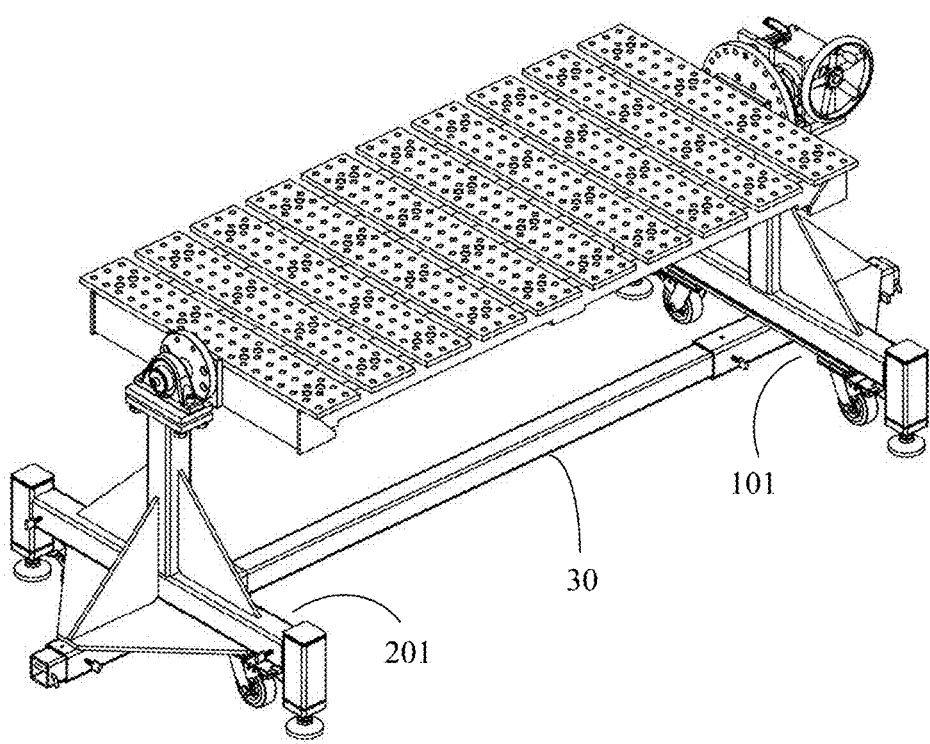
FIG. 2 shows a welding table installed to a rotary positioner of the present invention where the welding table is in a substantially horizontal position.
Figure 3:
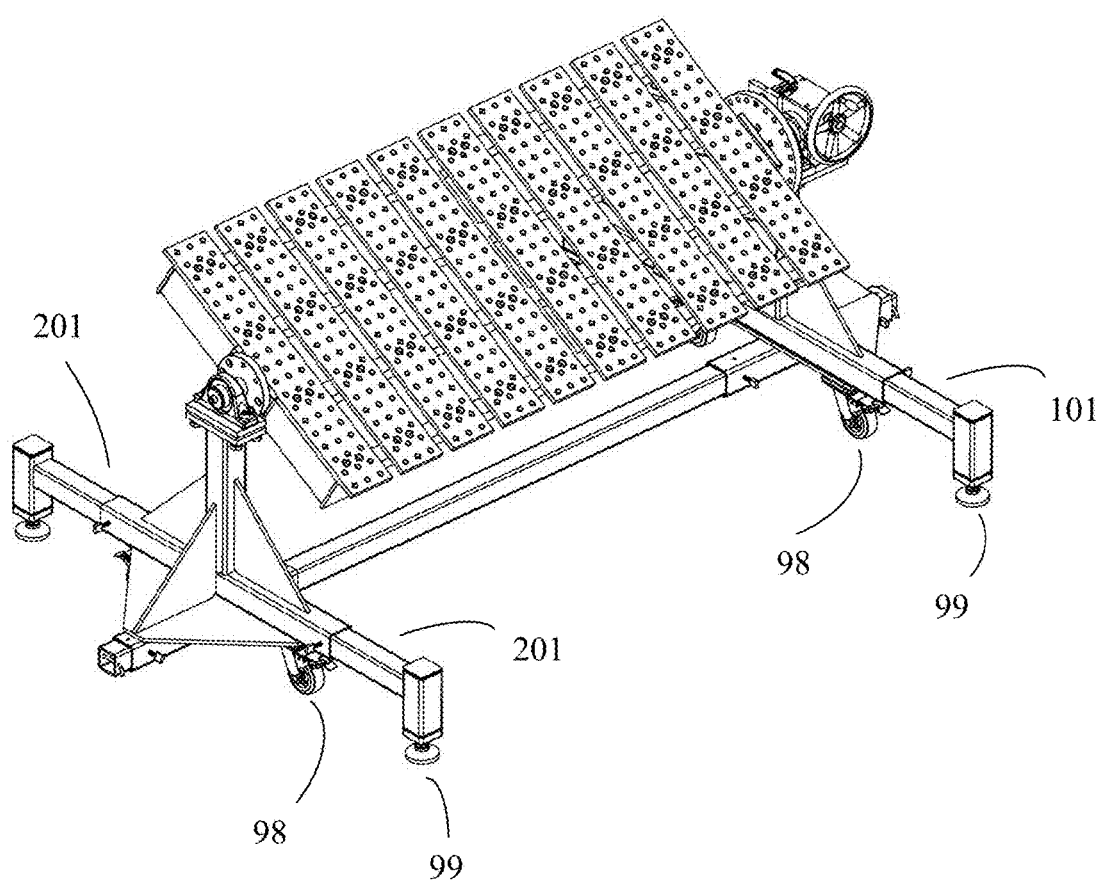
FIG. 3 shows a welding table installed to a rotary positioner where the welding table is set to have an incline angle.

As shown in FIGS. 1-3, an active rotating mechanism 110 is located in the upper portion section of the first vertical frame 10. Said second vertical frame 20 has a tail stock 200, which further consists of a height adjustment mechanism 205 and a passive rotation mechanism 210.

As shown in FIGS. 1-4, first vertical frame 10 has two outriggers 101 and second vertical frame 20 has two outriggers 201. These outriggers are made in a telescopic fashion where the outriggers can be pulled out from the two vertical frames 10/20. These outriggers 101 and 201 extend outward from the two vertical frames 10/20 in a perpendicular orientation to the chassis-bar 30.

At the respective distal portions of the outriggers 101 and 201, there are height adjustment knobs 99 that allow adjusting the height to that specific point when set on the ground. At the two sides of each of the two vertical frames, a caster wheel 98 is fixed to the under portion of the vertical frames (10 and 20), used for moving the rotary positioner around in all direction, when the adjustment knobs 99 are retracted to maintain some clearance from the ground.

The mechanism of the height adjustment knobs 99 and the caster wheels 98 are known art and there is no need to provide any mechanical details herein and this application claimed no novelty of these structures, other than the combination to the remaining structure and overall enabling disclosure herein.

A locking mechanism is provided to secure and lock each of the two vertical frames 10/20 relative to their positions with respective to their slidable movements along the length of the chassis-bar 30.

A similar, or same, locking mechanism is provided to lock the outriggers (101 and/or 201) relative to the vertical frames (10/20) from which the outriggers are extended out.

Figure 4:
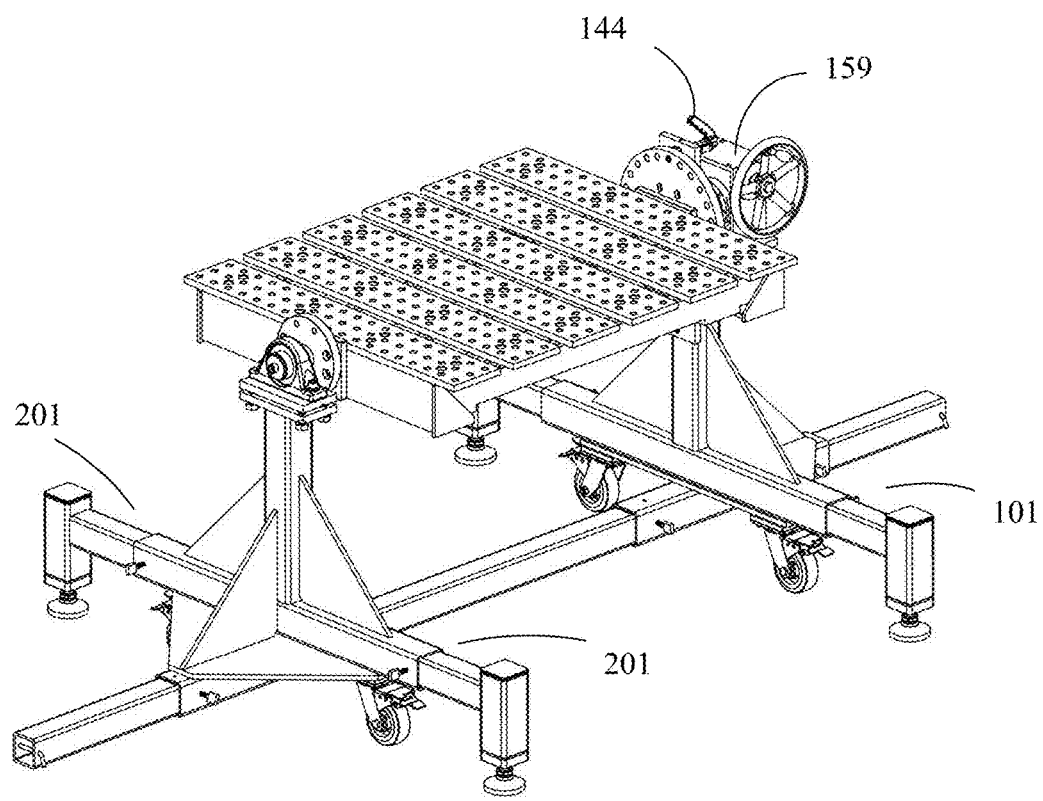
FIG. 4 shows the rotary positioner fitted with a shorter welding table.
Figure 5:
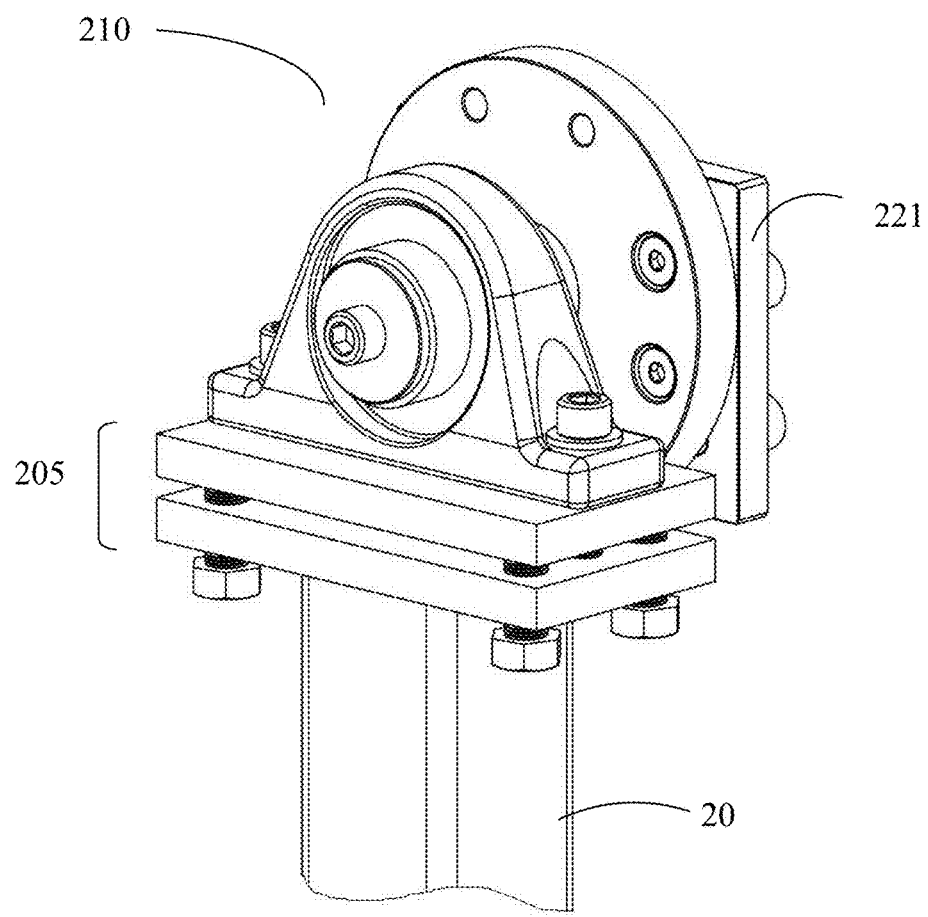
FIG. 5 shows the tail stock of the second vertical frame.
Figure 6:
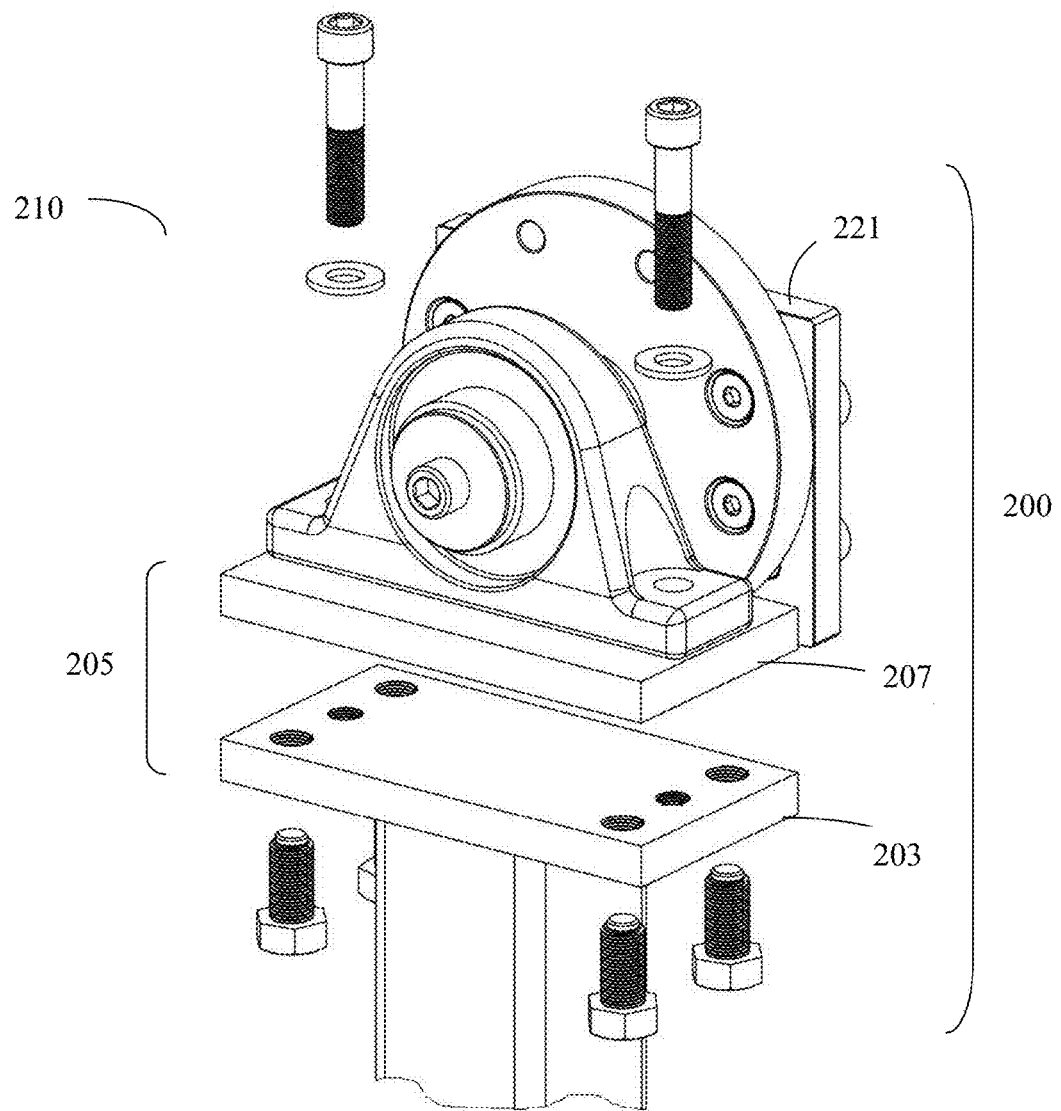
FIG. 6 shows the blow-up view of the tail stock of the second vertical frame.

The locking mechanism can be a single screw with turn-knob that can be tightened from the outside to the inside, as shown in FIGS. 3 and 4. Such a locking mechanism, as well as the specific implementation of a single screw with turn-knob, is a known art and requires no additional disclosure.

The active rotating mechanism 110 is further made up of a rotating plate 120 and a turning mechanism 150, connected by a rotating shaft 130. See FIG. 7. The rotating shaft 130 is placed through and within a first hole 139 made on the top portion of the first vertical frame 10.

Figure 10:
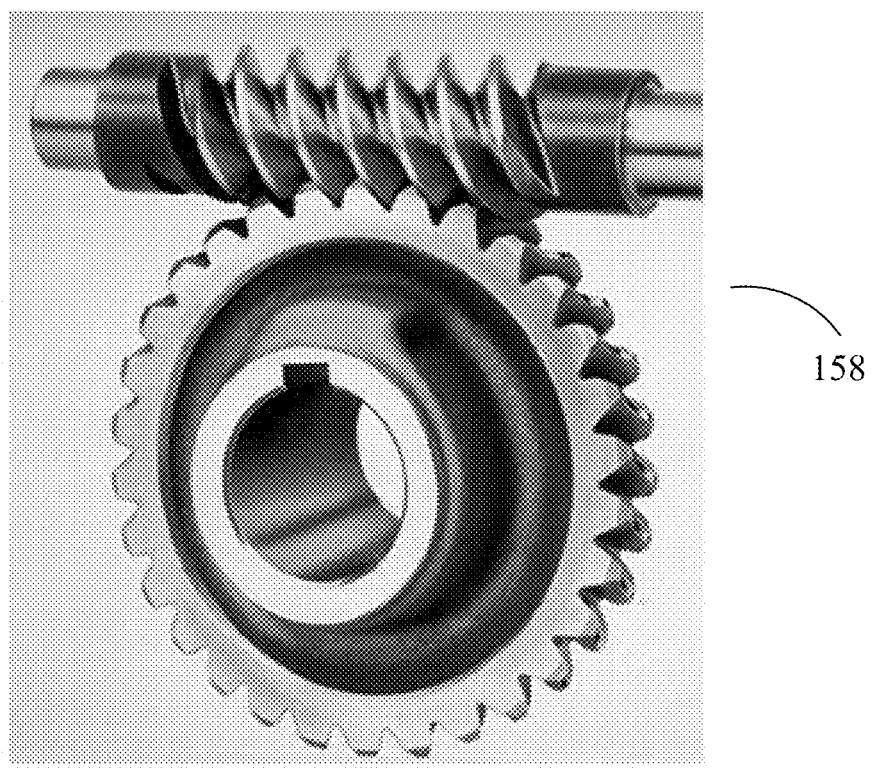
FIG. 10 shows a worm gear implementation of the gear box on the active rotating mechanism.

The turning mechanism 150 consists of a hand wheel 151 that is connected to a gear box 159, so that the axial turning direction of the hand wheel 151 is transformed by the gear box 159, results in a 90-degree direction change and aligning with the axial direction of the rotating shaft 130. As a non-limiting example of the gear box 159 implementation, a worm gear 158 is shown herein in FIG. 10.

The worm gear 158 is a known art and its implementation, including connection to the hand wheel 151, requires no additional disclosure herein.

Figure 7:
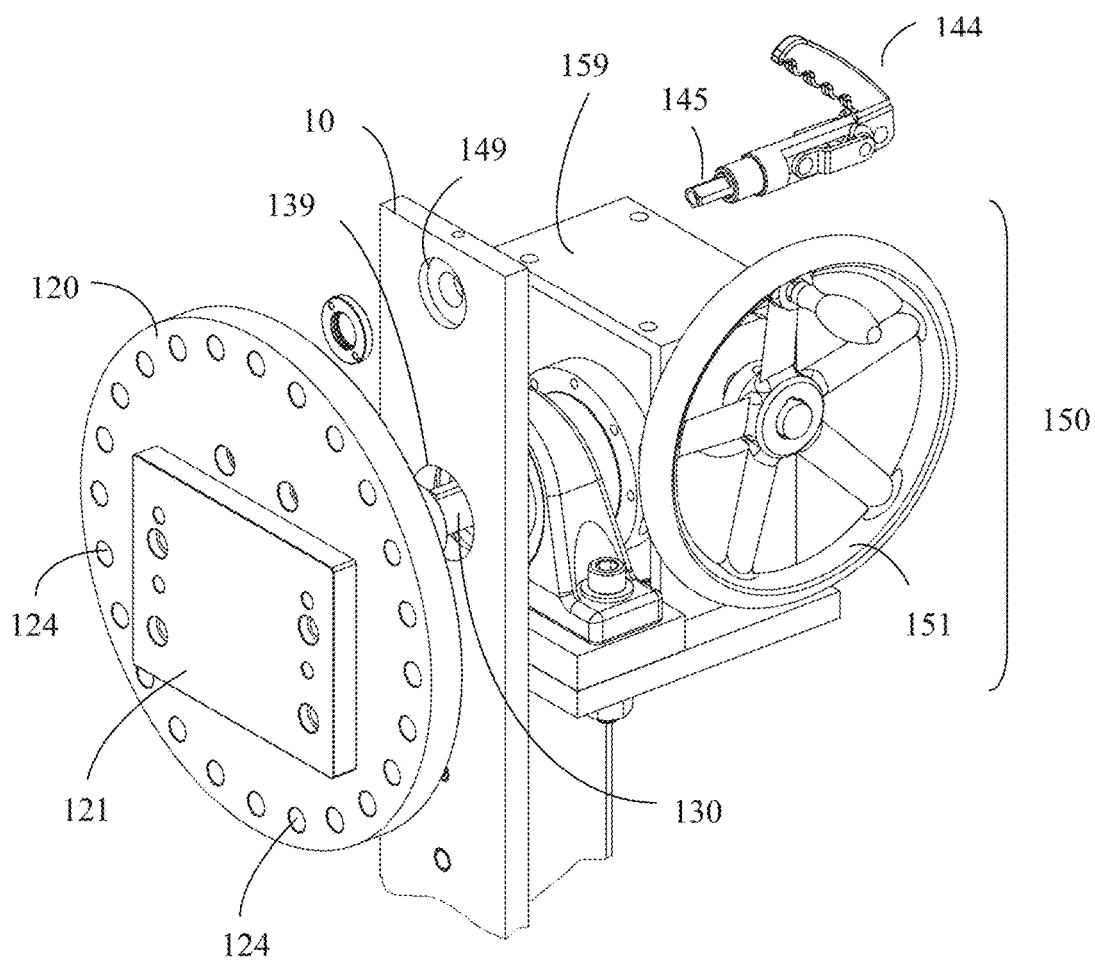
FIG. 7 shows the blow-up view of the active rotating mechanism of the first vertical frame.

A plurality of holes 124 are made around the peripheral portion of the rotating plate 120, as shown in FIGS. 1 and 7. A specific example is that there are a total of 24 holes 124 that are made on plate 120, so that the gap angle between any two holes 124 is 15 degrees.

Figure 11:
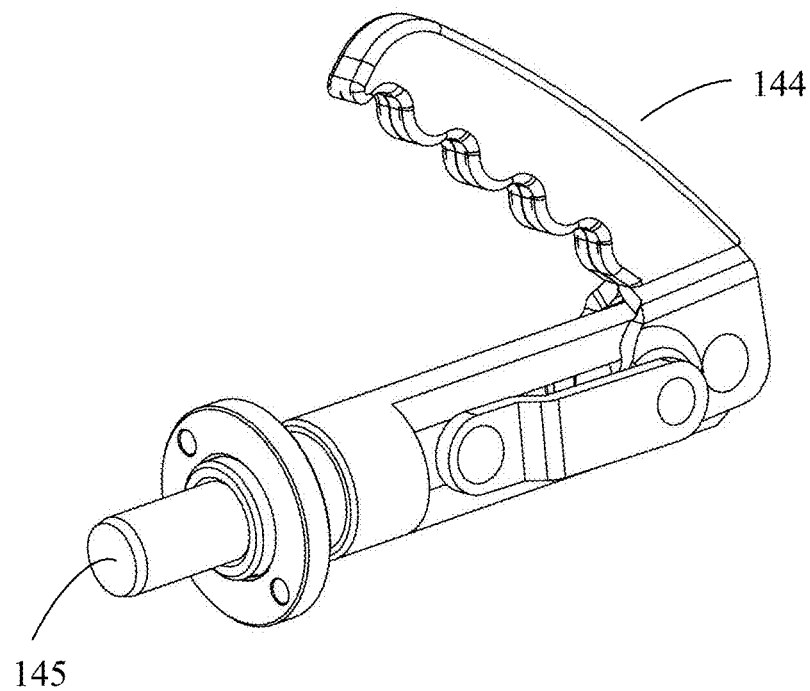
FIG. 11 shows a toggle latch with an alternative plunger end being substantially round in shape.
Figure 12:
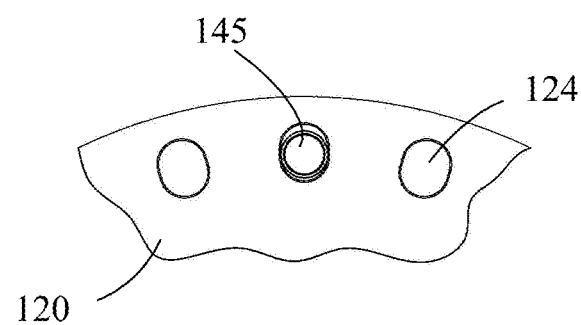
FIG. 12 shows the holes of the rotating plate to be oval, with the round plunger end inserted, creating limited vertical play.

The holes 124 can be alternatively made into oval shape, as shown in FIG. 12. This is to work with a plunger end 145 being a substantially round shape, as shown in FIG. 11

The tail stock 200 consists of a passive rotating mechanism 210 that sits on top of a height adjustment mechanism 205, which in turn is made up of an upper plate 207 and a lower plate 203. Between the two plates 207 and 203, 4 screws were used to keep a gap, serving as the mechanism to adjust the gap, and thus the height of the passive rotating mechanism 210.

The structure of a passive rotating mechanism 210 is a free-rotating flywheel, the construction of such a flywheel is a known art and requires no disclosure herein and forms no part of the claimed novelty point except to the extent it is combined with other elements and teachings disclosed herein.

The rotating plate 120 further has a first connection plate 121; the passive rotating mechanism 210 further has a second connection plate 221. The two connection plates 121/221 provide for the connection to installing a welding table, so that the active rotating mechanism 110 and the passive rotating mechanism 210 are set up in a way to be in an axially aligned position, so that a welding table can be installed between the two rotating mechanisms (110 and 210) and be set to an incline angle or position as desired, as shown in FIGS. 2 and 3. The incline angle, or the rotation, of a welding table is controlled by the motion actuated by the hand wheel 151 of the active rotation mechanism 110.

No specific mechanism is disclosed, or claimed, as to the way a welding table is installed to the connection plates 121/221. The installation of a welding table to two holding units is a known technique and requires no disclosure herein.

The turning mechanism 150 further has a toggle latch 144 with a plunger end 145 for inserting through a second hole 149 on the first vertical frame 10. See FIGS. 7 and 8.

The plunger end 145 inserts into one of the holes 124, serving as the means to lock the incline angle of a welding table in place, as desired.

Figure 8:
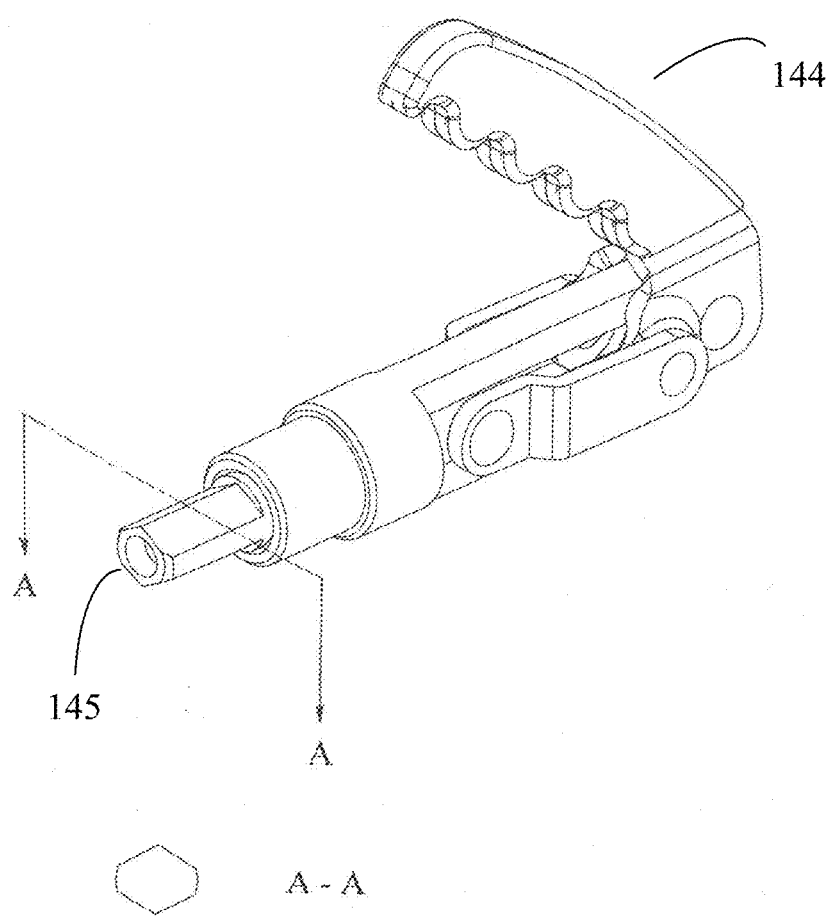
FIG. 8 shows the toggle latch. The A-A cross section line shows the plunger end tip to be of a rounded rhombus shape.
Figure 9:
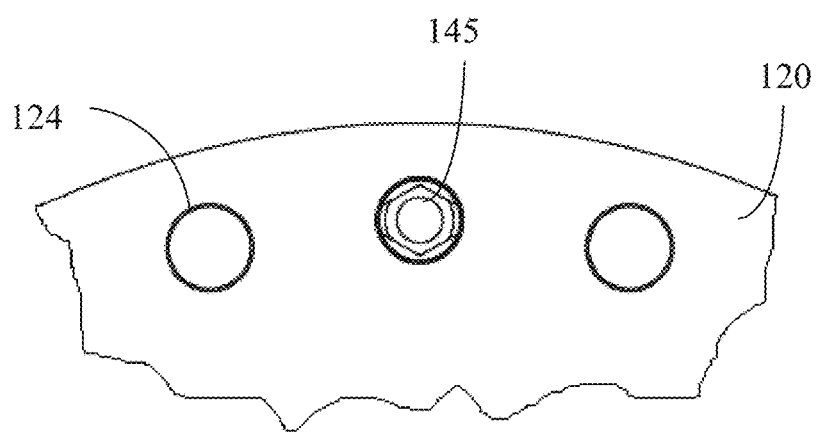
FIG. 9 shows a plunger end fitted into a selected hole on the rotating plate.

As an example of non-limiting implementation, the cross section of the tip of the plunger end 145 is made into a rhombus shape, allowing limited range of vertical play and tolerance when latching into any one of the 24 holes 124 as selected from the rotating plates 120. As shown in FIG. 8, the A-A cross section line shows the plunger end 145 to be a rounded rhombus shape.

Another non-limiting implementation of the plunger end 145 is that of a round shape, as shown in FIG. 11. So when the plunger end 145 is inserted, via the motion of the toggle latch 144, into the rotating plate 120 with the oval-shaped holes 124, some limited range of vertical play and tolerance is achieved.

What is claimed is:

1. A rotary positioner, comprising:
   a chassis-bar;
   a first vertical frame further having an active rotating mechanism in the upper section of said first vertical frame; and
   a second vertical frame further having a tail stock in the upper section of said second vertical frame, the tail stock further comprising a height adjustment mechanism and a passive rotating mechanism,
   wherein
   (a) each of the two vertical frames further having a wrapping tube snuggly wrap around the chassis-bar, resulting in a slidable connection with the chassis-bar to allow movements of the vertical frames along the length of the chassis-bar;
   (b) each of the two vertical frames further having two outriggers extending telescopically outward in a perpendicular orientation to the chassis-bar;
   (c) the height adjustment mechanism further consisting of one lower plate and one upper plate that are connected by 4 screws that provide for the adjustment of the gap between the two plates, achieving the height adjustment of the passive rotating mechanism that sits upon the upper plate; and
   (d) said active rotating mechanism further consisting of a rotating plate connected by a rotating shaft to a turning mechanism through a first hole on the first vertical frame.

2. The rotary positioner of claim 1 wherein the rotating plate contains a first connection plat and passive rotating mechanism contains a second connection plate, whereby a welding table can be connected to the two connection plates and be rotated by the controlled rotation motion actuated by the active rotating mechanism.

3. The rotary positioner of claim 1 wherein a plurality of holes are made around the peripheral portion of the rotating plate and the turning mechanism further having a handwheel controlling a gear box connected to the rotating shaft.

4. The rotary positioner of claim 1 wherein the turning mechanism further having a toggle latch with a plunger end for inserting through a second hole on the first vertical frame, for fittingly placed into one of the plurality of holes of the rotating plate.

5. The rotary positioner of claim 1 wherein a caster wheel is attached to the two sides of each of the two vertical frames for moving the rotary positioner around in all directions.

6. The rotary positioner of claim 1 wherein a locking mechanism is provided to lock the two vertical frames relative to their positions with respect to their slidable movements along the length of the chassis-bar.

7. The rotary positioner of claim 1 wherein a locking mechanism is provided to lock the outriggers relative to the vertical frames from which the outriggers are extended out.

8. The rotary positioner of claim 4 wherein the cross section of the plunger end is made into a rounded-rhombus shape, allowing limited range of vertical tolerance when latching into any one of the selected holes on the rotating plate.

9. The rotary positioner of claim 4 wherein the cross section of the plunger end is made into a substantially round shape, for latching into a matching rotating plate with holes that are oval shaped, allowing limited range of vertical tolerance.

10. The rotary positioner of claim 1 wherein the plurality of holes made around the peripheral portion of the rotating plate is 24 so as to form a 15-degree turning gap between any two holes.

11. The rotary positioner of claim 1 wherein the two outriggers of each of the two vertical frames further having height-adjustment knobs at distal end portions of the outriggers.

\* \* \* \* \*